United States Patent [19]
Lee et al.

[11] Patent Number: 5,638,321
[45] Date of Patent: Jun. 10, 1997

[54] RECORDING APPARATUS FOR INTEGRATED CIRCUIT CARD USING NAND-TYPE FLASH MEMORY

[75] Inventors: Young-man Lee, Suwon; Chan-dong Cho, Ansan; Won-woo Rhee, Sungnan; Byung-jun Kim, Suwon; Eun-sang Park, Seoul, all of Rep. of Korea

[73] Assignee: Samsung Electronics Co., Ltd., Kyungki-do, Rep. of Korea

[21] Appl. No.: 631,977

[22] Filed: Apr. 15, 1996

[30] Foreign Application Priority Data

Apr. 15, 1995 [KR] Rep. of Korea .................. 95-8867

[51] Int. Cl.$^6$ .................................................. G11C 11/34
[52] U.S. Cl. ........................... 365/185.17; 365/238.5; 365/185.12; 365/185.2
[58] Field of Search ................... 365/185.17, 238.5, 365/185.12, 185.2, 239

[56] References Cited

U.S. PATENT DOCUMENTS

| | | | |
|---|---|---|---|
| 5,297,029 | 3/1994 | Nakai et al. | 365/238.5 |
| 5,566,105 | 10/1996 | Tanaka et al. | 365/185.17 |
| 5,572,466 | 11/1996 | Sukegawa | 365/185.12 |

*Primary Examiner*—David C. Nelms
*Assistant Examiner*—Huan Hoang
*Attorney, Agent, or Firm*—Sughrue, Mion, Zinn, Macpeak & Seas

[57] ABSTRACT

A recorder for an IC memory card (37) using a NAND-type flash memory assigns a single address to both audio and video source data, matching a structure of the NAND-type flash memory. Consequently, the audio and video source data may be recorded with a single address. The recorder includes a first memory (32) for accessing video data in units of a basic region of one page in the NAND-type flash memory, and a second memory (33) for accessing audio data in units of a dummy region of one page in the NAND-type flash memory. A first latch (34) and a second latch (35) match the timing of the video data and the audio data, respectively, accessible from the memories (32, 33). A page memory (36) records the video data output via the first latch (34) and then records the audio data output via the second latch (35) sequentially to thereby store data of a whole one-page unit. A controller (31) is provided for accessing the video data in units of a basic region from the first memory (32), accessing the audio data in units of a dummy region from the second memory (33), and enabling the first and second latches (34, 35) to be latched in order to sequentially record the audio and video data together in the page memory (36). Then a single address is assigned, in the IC memory card, to a one-page unit data stored in the page memory (36) to record the one-page unit of data, containing both audio and video information.

11 Claims, 4 Drawing Sheets

| ADDRESS | DATA REGIONS |
|---|---|
| 0000 0000 ⋮ 0000 00FF | TOC REGION |
| 0000 0100 ⋮ 0111 1111 | VIDEO REGION |
| 1000 0000 ⋮ 1111 1111 | AUDIO REGION |

RECORDING APPARATUS FOR INTEGRATED CIRCUIT CARD USING NAND-TYPE FLASH MEMORY

BACKGROUND OF THE INVENTION

The present invention relates to a recording apparatus for an integrated circuit (IC) memory card using a NAND-type flash memory, and more particularly, to an apparatus for recording two signals each of which has a different source in an IC memory card by using a characteristic of a structure of a NAND-type flash memory to assign a single address to the two signals.

A technology of recording/reproducing video and audio signals with respect to a recording medium such as semi-conductor memory in the form of an IC memory card has been known. A conventional IC memory card which does not use a NAND-type flash memory records different source data such as a video signal, an audio signal and a text signal in a respective separate region based on the structural characteristic thereof. Thus, a respective separate address has been assigned to the separate regions.

FIG. 1 is a view for explaining a recording format of a conventional IC memory card which does not use a NAND-type flash memory.

As shown in FIG. 1, the conventional IC memory card which does not use a NAND-type flash memory is partitioned into a table-of-contents (TOC) region for recording data characterizing a card such as a card attribute and a recording format, a video region and an audio region, to which a corresponding address is assigned, respectively. Since such a conventional IC memory card records video and audio signals in the respective regions and has a respective separate address, the video signal should be synchronized with the audio signal.

To solve the above problem, the conventional IC memory card can be replaced by an IC memory card using a NAND-type flash memory. FIG. 2 is a view for explaining a structure of a NAND-type flash memory. The NAND-type IC memory card has an array of rows and columns. Each column has a 256-byte basic region and 8-byte dummy region. Every bit of each row forms a one-page unit.

Since different source data can be recorded in the basic and dummy regions using the NAND-type flash memory having the above-described structure, a single address can be assigned to the data of two different sources.

SUMMARY OF THE INVENTION

Therefore, to solve the above problem, it is an object of the present invention to provide a recording apparatus for an IC memory card using a NAND-type flash memory which can record different source data by assigning a single address to the different source data to meet a structure of the NAND-type flash memory when the NAND-type flash memory is used in an IC memory card.

To accomplish the above object of the present invention, there is provided a recording apparatus for an integrated circuit (IC) memory card using a NAND-type flash memory, the recording apparatus comprising:

a first memory portion for giving access to first data in units of a basic region of a one-page;

a second memory portion for giving access to second data in units of a dummy region of one page in the NAND-type flash memory;

a first latch portion for matching a timing of the first data output from the first memory;

a second latch portion for matching a timing of the second data output from the second memory;

a page memory portion for recording the first data output from the first latch portion and then recording the second data output from the second latch portion sequentially to thereby store data of the whole one-page unit; and a controller portion for gaining access to the first data in units of a basic region from first memory portion, and gaining access to the second data in units of a dummy region from the second memory portion, enabling the first and second latch portions to be latched in order to sequentially record the first and second data in the page memory portion, and assigning a single address to a one-page unit data stored in the page memory portion to record the one-page unit data in an IC memory card.

BRIEF DESCRIPTION OF THE DRAWINGS

The above object of the present invention will become more apparent by describing in detail preferred embodiments thereof with reference to the attached drawings in which.

DETAILED DESCRIPTION OF THE PREFERRED EMBODIMENT

A preferred embodiment of the present invention will be described below in more detail with reference to the accompanying drawings.

Figures 1, 2:
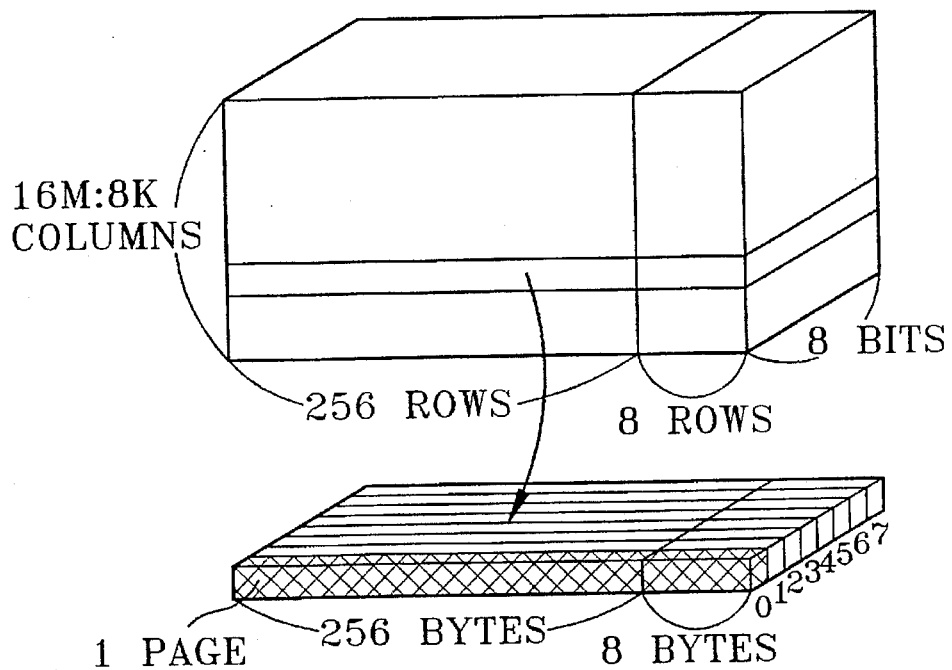
FIG. 1 is a view for explaining a recording format of a conventional IC memory card.
FIG. 2 is a view for explaining a structure of a NAND-type flash memory.
Figure 3:
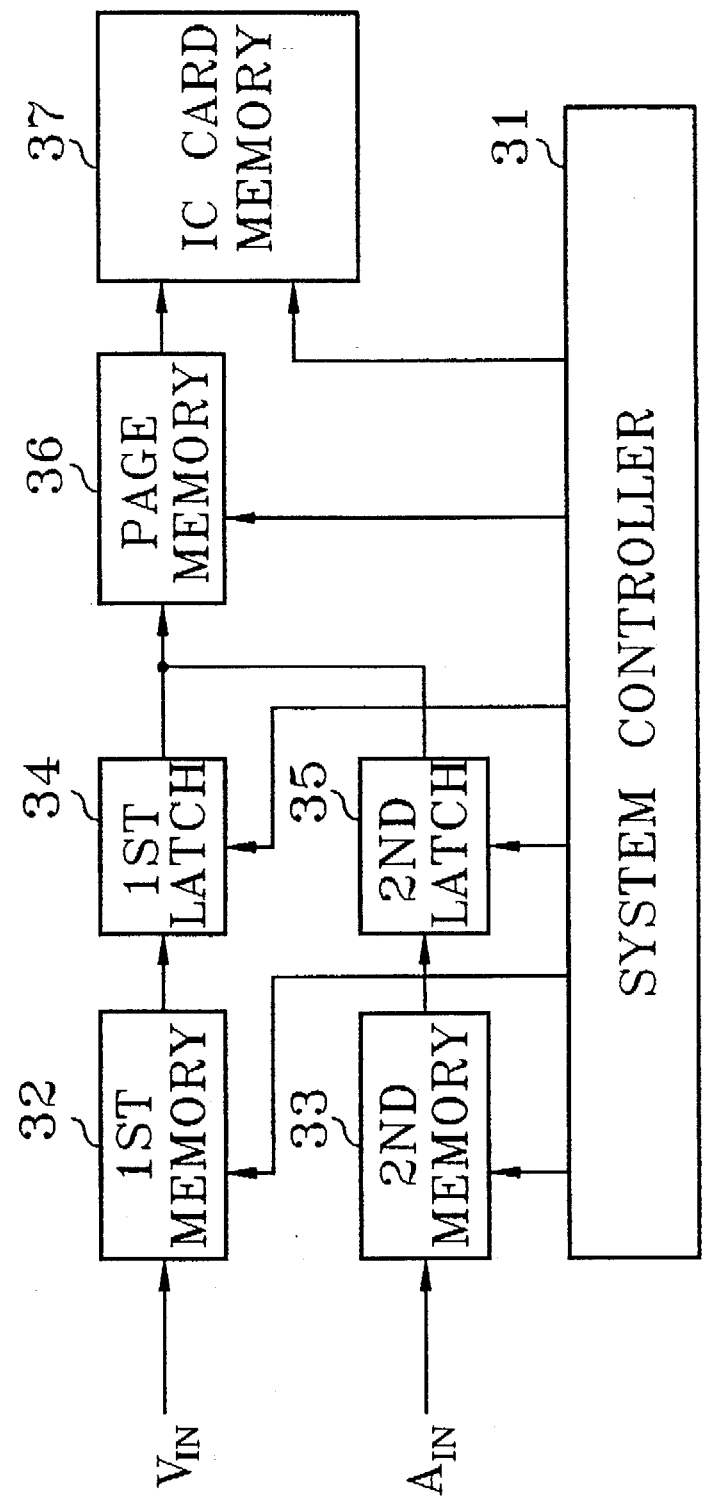
FIG. 3 is a block diagram of a recording apparatus for an IC memory card using a NAND-type flash memory according to one embodiment of the present invention.

As shown in FIG. 3, a recording apparatus for an IC memory card using a NAND-type flash memory according to one embodiment of the present invention, includes a first memory 32 which can access first data in units of two-hundred fifty-six (256) bytes according to a format of a basic region in a one-page unit of the NAND-type flash memory, and a second memory 33 which can access second data in units of eight (8) bytes according to a format of a dummy region. The first and second memories 32 and 33 store different source data from each other. In this embodiment, the first data stored in the first memory 32 is a video signal and the second data stored in the second memory 33 is an audio signal signal.

To match an output timing of the different source data, latches 34 and 35 are connected to respective output ends of the first and second memories 32 and 33. The output end of the latches 34 and 35 are connected to a page memory 36 for storing data of one page unit in the NAND-type flash memory. Accordingly, the page memory stores the data output from each latch in units of a one-page to match the timing. Specifically, the page memory 36 sequentially stores a video signal which is the 256-byte first data output from the first latch 34, and an audio signal which the 8-byte second data output from the second latch 35. That is, the whole 264-byte data is stored as a one-page unit in the page memory 36.

The output end of the page memory 36 is connected to an IC memory card 37 which uses the NAND-type flash memory. Thus, a single address is assigned to the 256-byte data of the one page unit output from the page memory 36, in order to be recorded in the IC memory card 37.

A system controller 31 gains access to the first data in units of the 256-bytes from the first memory 32 and gains access to the second data in units of the 8-byte from the second memory 33. The system controller 31 also enables the first and second latches 34 and 35 to be latched in order to sequentially record the first and second data in the page memory 36. The system controller 31 also assigns a single address to data of each one-page unit stored in the page memory 36 to record the data in the IC memory card 37.

FIGS. 4A through 4D are timing diagrams for a recording operation in the page memory 36 and the IC memory card 37 shown in FIG. 3.

Figure 4:
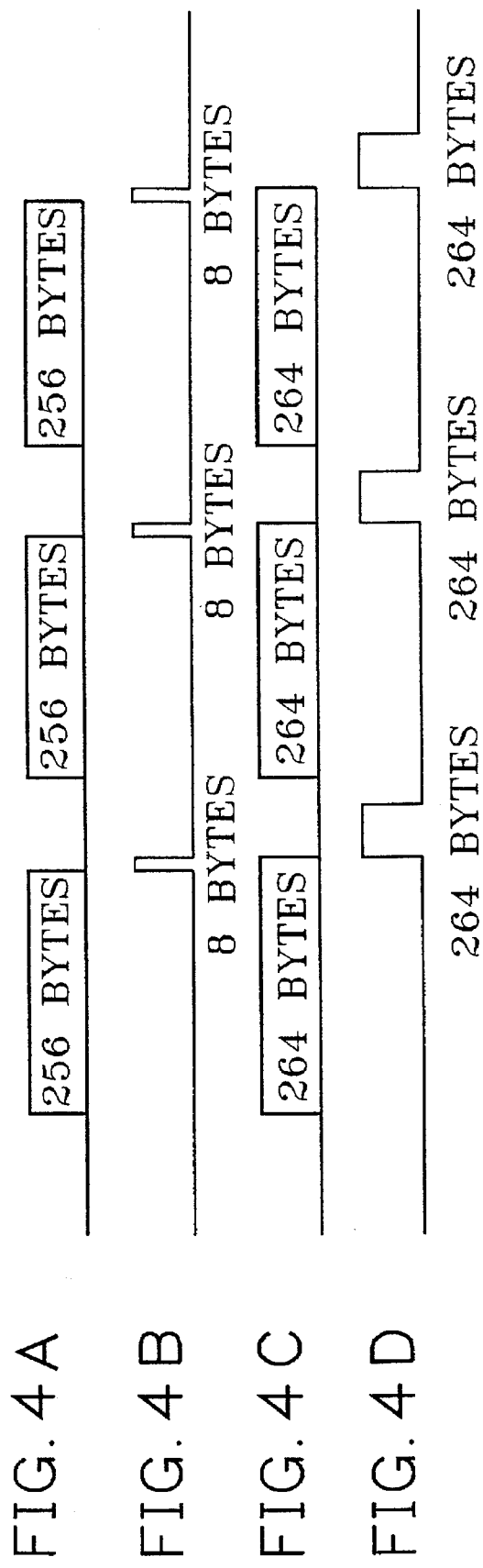
FIGS. 4A through 4D are timing diagrams for a recording operation in a page memory and an IC memory card shown in FIG. 3.

FIG. 4A shows a timing when a video signal of the 256-byte first data is recorded in the page memory 36. FIG. 4B shows a timing when an audio signal of the 8-byte second data is recorded in the page memory 36. FIG. 4C shows a general timing when the video signal of the 256-byte first data and the audio signal of the 8-byte second data are recorded in the page memory 36. FIG. 4D shows a timing when the whole 264-byte data is recorded in the IC memory card 37.

In other words, the video signal of the 256-byte first data is firstly recorded in the page memory 36 and then the audio signal of the 8-byte second data is recorded therein. Accordingly, the total 264-byte data of the one-page unit is recorded therein. Then, a single address is assigned to the 264-byte data of the one-page unit to be recorded in the IC memory card 37.

Figure 5:
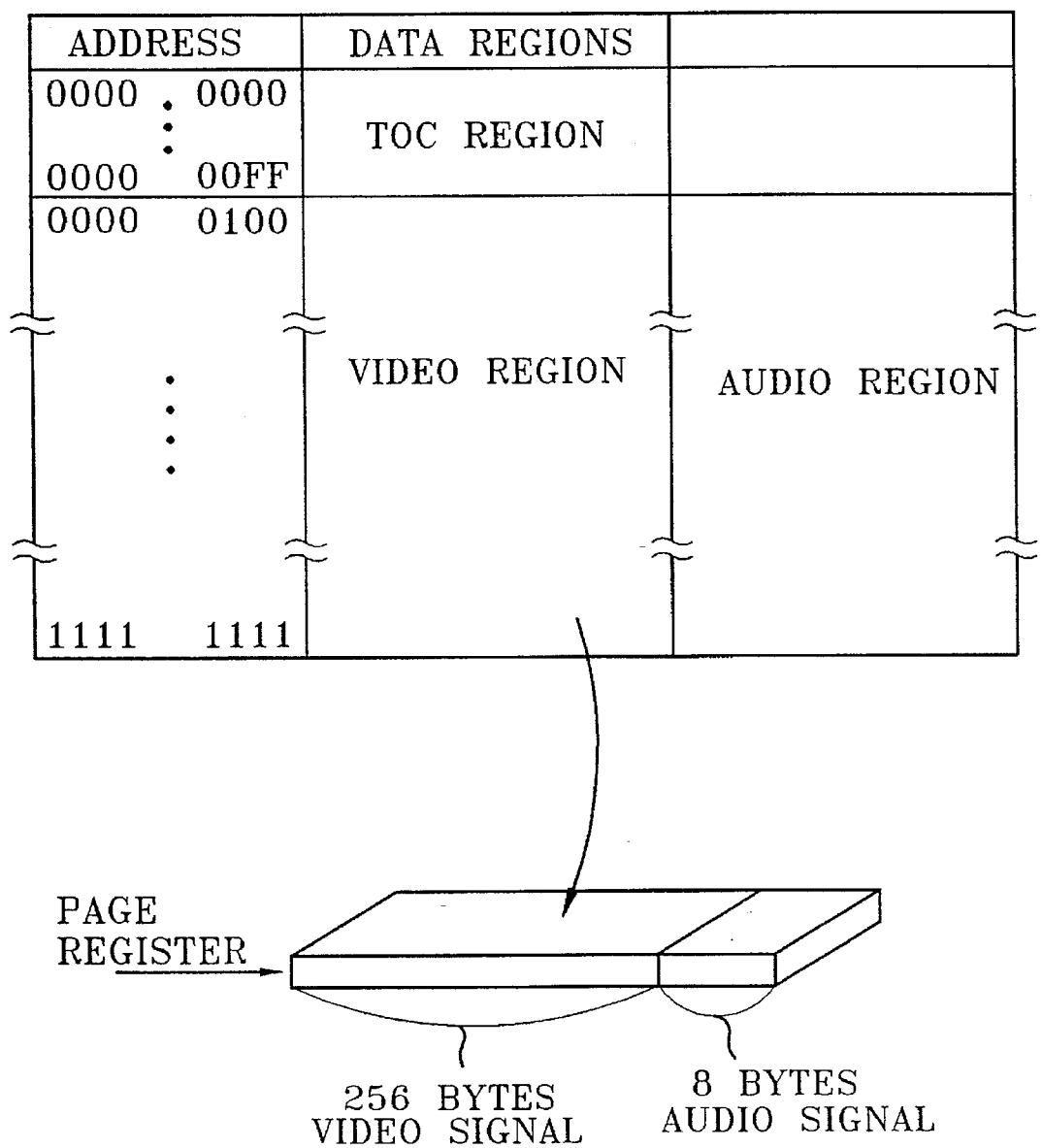
FIG. 5 is a view for explaining a recording format of the IC memory card which uses the NAND-type flash memory recorded by the FIG. 3 apparatus.

FIG. 5 is a view for explaining a recording format of the IC memory card which uses the NAND-type flash memory recorded by the FIG. 3 apparatus.

As shown in FIG. 5, the video signal of the 256-byte first data is recorded in the basic region of the NAND-type flash memory. Meanwhile, the audio signal of the 8-byte second data is recorded in the dummy region of the NAND-type flash memory. Thus, the 256-byte video signal and the 8-byte audio signal becomes to have a commonly assigned address. As a result, the single address can give access to the video and audio signals.

As described above, the recording apparatus for the IC memory card using the NAND-type flash memory assigns a single address to the different source data to match a structure of the NAND-type flash memory, to thereby enable the different source data to be recorded with the single address.

What is claimed is:

1. A recording apparatus for an integrated circuit (IC) memory card using a NAND-type flash memory, said recording apparatus comprising:

a first memory for giving access to first data in units corresponding to a basic region of one page in the NAND-type flash memory;

a second memory for giving access to second data in units corresponding to a dummy region of one page in the NAND-type flash memory;

a first latch for latching said first data output from said first memory;

a second latch for latching said second data output from said second memory;

a page memory for storing the first data latched by said first latch and then storing the second data latched by said second latch sequentially to thereby store data of a whole one-page unit; and a controller for accessing the first data in units of a basic region from said first memory and accessing the second data in units of a dummy region from said second memory by enabling said first and second latches to be latched in order to sequentially store the first and second data in said page memory, and assigning a single address to the whole one-page unit of data stored in said page memory portion to record the whole one-page unit of data in the IC memory card.

2. The recording apparatus for an integrated circuit (IC) memory card using a NAND-type flash memory according to claim 1, wherein said whole one-page unit of data recorded in the IC memory card comprises a 256-byte basic region and an 8-byte dummy region.

3. The recording apparatus for an integrated circuit (IC) memory card using a NAND-type flash memory according to claim 2, wherein said basic region of one page is 256 bytes as an access unit of said first memory, and said dummy region of one page is 8 bytes as an access unit of said second memory.

4. A recording apparatus for an integrated circuit memory card, said recording apparatus comprising:

a first memory for providing first data in units corresponding to a basic region of one page in the integrated circuit memory card;

a second memory for providing second data in units corresponding to a dummy region of one page in the integrated circuit memory card;

a page memory for storing the first data provided by said first memory and then sequentially storing the second data provided by said second memory, to thereby store data of a whole one-page unit in said page memory; and a controller for controlling the storing of the first data in units of a basic region and the storing of the second data in units of a dummy region, in sequential order, in said page memory, and assigning a single address to the whole one-page unit of data stored in said page memory to record the whole one-page unit of data in the IC memory card at the assigned single address.

5. The recording apparatus for an integrated circuit memory card according to claim 4, wherein said whole one-page unit of data recorded in the IC memory card comprises a 256-byte basic region and an 8-byte dummy region.

6. The recording apparatus for an integrated circuit memory card according to claim 5, wherein said basic region of one page is 256 bytes as an access unit of said first memory, and said dummy region of one page is 8 bytes as an access unit of said second memory.

7. The recording apparatus for an integrated circuit memory card according to claim 4, wherein the integrated circuit memory card comprises a NAND-type flash memory.

8. A method of recording data in an integrated circuit memory card having a NAND-type flash memory, said method comprising the steps of:

(a) providing a first data in units corresponding to a basic region of one page in the integrated circuit memory card;

(b) providing a second data in units corresponding to a dummy region of one page in the integrated circuit memory card;

(c) latching said first data;

(d) latching said second data sequentially of the latching in step (c);

(e) storing data latched in steps (c) and (d) in a page memory to thereby store data of a whole one-page unit in said page memory;

(f) assigning a single address to the data stored in said page memory; and (g) recording the data stored in said page memory in the integrated circuit memory card at the assigned single address.

9. The method of recording data according to claim 8, wherein said whole one-page unit of data recorded in the IC memory card comprises a 256-byte basic region and an 8-byte dummy region.

10. The method of recording data according to claim 9, wherein said basic region of one page is 256 bytes as an access unit of said first memory, and said dummy region of one page is 8 bytes as an access unit of said second memory.

11. The method of recording data according to claim 8, wherein the integrated circuit memory card comprises a NAND-type flash memory.

* * * * *